June 26, 1934.   E. E. EMONS   1,964,664
SPECTACLES
Filed May 26, 1931
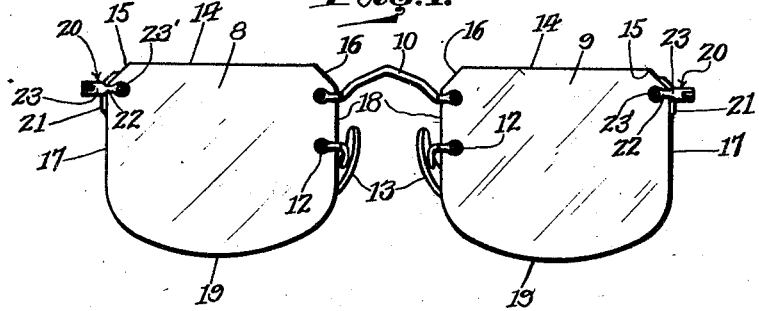
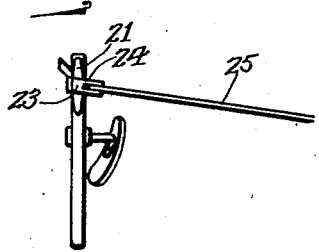
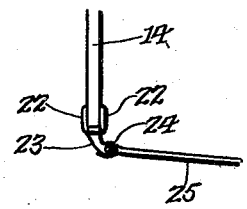
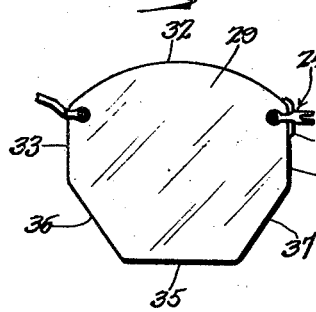
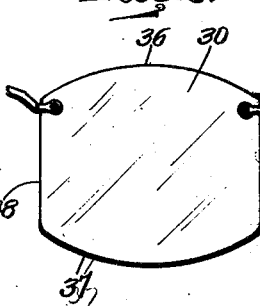
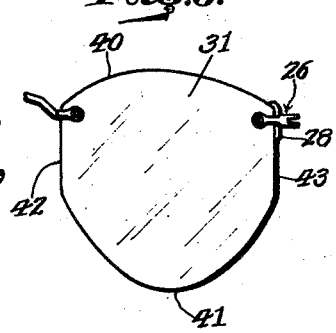
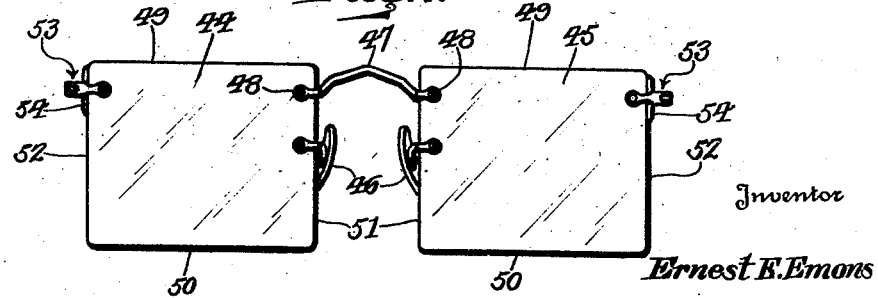
Inventor
Ernest E. Emons
By Geo. P. Kimmel
Attorney Patented June 26, 1934

1,964,664

UNITED STATES PATENT OFFICE 1,964,664

SPECTACLES

Ernest E. Emons, Wilmington, Del., assignor to The Ful-Vue Sales Company, Washington, D. C.

Application May 26, 1931, Serial No. 540,124

1 Claim. (Cl. 88—53)

This invention relates to a pair of rimless spectacles, the lenses of which have substantially straight temple side edges, and in which the endpieces are disposed at a position high-up on the lenses and against said side edges above the normal useful field of side vision of the wearer.

The object of the invention consists in the provision of a structure of spectacles of the rimless type, wherein the temple side or temple side edge of the lenses is formed with a straight or substantially perpendicular line when the spectacles are on the face of the wearer, this perpendicular temple edge extending upwardly from the horizontal median of the lens to a point adjacent the extreme top of the lens whereby a structure is created that permits of the placing of a spectacle endpiece high up on the lens above the pupil of the eye and above the normal useful field of side vision.

A further object of the invention consists in the provision in a pair of rimless spectacles of the type providing an unobstructed field of side vision when in place on the face of a wearer, of a combination and arrangement of parts whereby the weight of the spectacles will be balanced when the latter are in proper position on the face of a wearer so that the tendency of the spectacles to slide down on the nose of the wearer will be materially lessened if not entirely eliminated.

With the foregoing and other objects in view, the invention consists of the novel construction, combination and arrangement of parts as hereinafter more specifically described, and illustrated in the accompanying drawing, wherein is shown an embodiment of the invention, but it is to be understood that changes, variations and modifications can be resorted to which come within the scope of the claims hereunto appended.

In the drawing wherein like reference characters denote corresponding parts throughout the several views:

Figure 1 is an elevation of a pair of rimless spectacles in accordance with this invention, Figure 2 is a view looking towards a temple side of the spectacles, Figure 3 is a fragmentary view in top plan of the spectacles, Figures 4, 5 and 6 are fragmentary views in elevation of modified forms, Figure 7 is a front elevation of still another modified form of spectacles in accordance with this invention.

The spectacles as shown in Figures 1, 2 and 3 of the drawing include a pair of parallel spaced lenses 8, 9 of like form which are connected together in spaced relation from the nasal sides thereof by a bridge 10 which has its ends anchored, as at 11 to the lenses. Below bridge 10 and extended from the nasal sides of, as well as being anchored to the lenses, as at 12 are the oppositely disposed offset nose guards or pieces 13.

As these lenses 8, 9 are of like contour, but one will be described, since the description of one will apply to the other. Each lens has a straight top edge 14, a pair of oppositely inclined upper corner edges 15, 16 extended from the ends of edge 14, a substantially straight temple side edge 17 disposed approximately at right angles to and extending a substantial distance above the horizontal median of the lens, a straight nasal side edge 18 which also extends above the horizontal median referred to, and a bottom edge 19 of segmental contour. The lower ends of the corner edges 15, 16 merge into the edges 17, 18 respectively in proximity to the edge 14. The ends of the edge 19 merge into the lower ends of the edges 17, 18 below the horizontal median of the lens.

Extended from the temple side edge of each lens is an endpiece or lens holding member 20, positioned above the normal useful field of side vision and adjacent the upper part of the said substantially straight temple side edge 17. The end pieces are of like form and each consists of a lens edge abutting portion 21, a pair of lens face engaging parts or ears 22 extending inwardly about opposite side faces of a lens from said lens edge abutting portion 21 and a temple hinge support arm 23 extending from said lens edge abutting portion 21 in substantial horizontal alignment with said ears 22 and substantially at right angles to said abutting portion 21. The arm 23 is formed at its outer end with a hinge connection 24 for a temple bar 25. The portion 21 is extended along and disposed against said straight temple side edge 17 of a lens at a position above the normal useful field of side vision. As shown, the portion 21 is positioned at the upper part of edge 17 and is bent over upon the corner edge 15. The arrangement of the end piece 20 with respect to a lens is such that the ears 22 and arm 23 will be arranged in proximity to the top edge of the lens. The arm 23 is shown in Figure 2 as inclined slightly downward with respect to portion 21 and as being directed rearwardly to beyond the rear face of a lens. The ears 23 of the end piece 20 are anchored to a lens, as at 23'. The temple hinge connection 24 is disposed relative to the upper portion of the lens in such a manner as to form an acute angle between it and the back of the lens.

In Figures 4, 5 and 6, the end pieces or temporal attachments are designated 25, 26 and 27, respectively and they are of the same construction as the end piece 20. The end pieces shown in Figures 4, 5 and 6 have their temple side edge abutting portions 28 formed in a manner similar to that of the portion 21, that is to say the upper part of portion 28 is bent inwardly with respect to its lower part to abut an upper edge portion of a lens in addition to a temple side edge.

Figures 4, 5 and 6 illustrate lenses 29, 30 and 31 respectively, each of which is of a different contour with respect to the others. It will be noted however, that each of the lenses 29, 30 and 31 are similar in that they each embody a straight or substantially perpendicular temple side edge extending upwardly a substantial distance from the horizontal median of the lens to a point adjacent the extreme top of the lens. The lens 29 has an arcuate top edge 32, a straight nasal side edge 33, a straight temple side edge 34 and a bottom edge formed of a straight intermediate edge portion 35 and a pair of upstanding oppositely outwardly inclined end edge portions 36, 37 which merge at their upper end into the lower ends of the nasal and temple side edges 33, 34 respectively. The ends of the top edge 32 merge into the upper ends of the nasal and temple side edges 33, 34. The lens 30 has an arcuate top edge 36, a bottom edge 37 of segmental contour, a straight nasal side edge 38 and a straight temple side edge 39. The edges 38, 39 of lens 30 are of greater length than the edges 33, 34 respectively of the lens 29. The ends of edge 36 merge into the upper ends of the edges 38, 39. The ends of the edge 37 merge into the lower ends of the edges 38, 39. The lens 31 has an arcuate top edge 40, a bottom edge 41 of substantially semi-oval contour, a straight nasal side edge 42 and a straight temple side edge 43. The edges 42, 43 of lens 31 are of less length than the edges 38, 39 respectively of the lens 30. The ends of the edge 40 merge into the upper ends of the edges 42, 43. The ends of edge 41 merge into the lower ends of the edges 42, 43.

The end pieces 25, 26, 27 are anchored to the lenses 29, 30 and 31 respectively in close proximity to the top edges 32, 36 and 41 respectively and extend inwardly and outwardly relatively to the temple side edges 34, 39 and 43, respectively.

In Figure 7 of the drawing, the spectacles illustrated thereby include a pair of parallel spaced lenses 44, 45 of like form carrying nose guards or pieces 46, and connected together in spaced relation by a bridge 47 which has its ends anchored, as at 48 to the lenses.

The lenses 44, 45 are of like contour and but one will be described, as the description of one will apply to the other. Each lens is formed with a straight top edge 49, a straight bottom edge 50, a straight nasal side edge 51 and a straight temple side edge 52. The ends of edge 49 merge into the upper ends of edges 51, 52. The ends of edge 50 merge into the lower ends of edges 51, 52.

Secured to the temple sides of the lenses 44, 45 are the end pieces or temporal attachments 53, of the same construction as an end piece 20.

The temple side edge abutting portion 54 of an end piece 53 is straight and does not have its upper part bent inwardly like the upper part of the portion 21 of end piece 20. The end pieces 54 are anchored to the lenses 44, 45 in close proximity to the top edges of the latter and are positioned to abut the upper portion of the temple side edges of lenses 44, 45 as well as being positioned against the lens faces. In the foregoing described spectacles of Figure 7, the inventive structural details are similar in all respects with the spectacles shown in Figure 1 with the exception that the endpieces are so positioned that the lens edge abutting portions thereof abut entirely upon the straight temple side edges of the lens. The relative position of the endpieces and the lenses are however the same.

The arrangement of offset nose guards and the provision of the acute angle between the back of the lens and the temple hinge connection, as previously herein described, will substantially lessen if not entirely eliminate the tendency of the spectacles to ride down on the nose of a wearer, by causing the weight of the spectacles to be balanced.

Each of the several forms shown, provide a rimless spectacle structure whereby an end piece may be placed high up on the temple side edge of the lenses thereof, so as to be positioned above the pupils of the eyes and above the normal useful field of side vision of a wearer of the spectacles.

The several shapes of lenses shown serve only to emphasize that the shape of the lens is immaterial except insofar as that part of the lens consisting of the upper outer side is concerned, the latter part being essentially as shown, in order to make feasible the combination claimed.

What I claim is:—

In a pair of rimless spectacles of the type providing an unobstructed side vision when in place on the face of a wearer, a lens having a substantially straight temple side edge extending upwardly from the horizontal median of the lens a sufficient distance in a substantially vertical direction to permit of the attachment of a spectacle endpiece at a point above the useful field of side vision of a wearer of said spectacles, an endpiece of the type adapted only for engagement directly with the spectacle lens and having a lens edge abutting portion, a lens face engaging part and a temple hinge-supporting arm, said endpiece being positioned on the said upwardly extending temple side edge of said lens at a point above the useful field of side vision of a wearer of said spectacles and adjacent the upper part of the said substantially straight side edge of the lens, said temple hinge-supporting arm extending from said portion substantially at right angles and rearwardly of the latter with respect to the front of the spectacles and having its outer end formed with a temple hinge connection, said temple hinge connection disposed relative to the upper portion of the lens to form an acute angle between it and the back of the lens; and said spectacles provided with noseguards offset with respect to the plane of the lenses.

ERNEST E. EMONS.